US012640985B2

(12) United States Patent
Karkhanis et al.

(10) Patent No.: US 12,640,985 B2
(45) Date of Patent: May 26, 2026

(54) HITLESS NETWORK TRAFFIC POLICY UPGRADES

(71) Applicant: Arista Networks, Inc., Santa Clara, CA (US)

(72) Inventors: Nitin Karkhanis, Fremont, CA (US); Joseph Olakangil, San Jose, CA (US); Aman Aman-Ul-Haq, Surrey (CA); Purushothaman Nandakumaran, Milpitas, CA (US); Anuraag Mittal, Livermore, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 99 days.

(21) Appl. No.: 18/747,653

(22) Filed: Jun. 19, 2024

(65) Prior Publication Data
US 2025/0392515 A1      Dec. 25, 2025

(51) Int. Cl.
| | |
|---|---|
| *G06F 15/173* | (2006.01) |
| *H04L 41/0894* | (2022.01) |
| *H04L 45/586* | (2022.01) |
| *H04L 47/20* | (2022.01) |

(52) U.S. Cl.
CPC ........ *H04L 41/0894* (2022.05); *H04L 45/586* (2013.01); *H04L 47/20* (2013.01)

(58) Field of Classification Search
CPC .... H04L 41/0894; H04L 45/586; H04L 47/20
See application file for complete search history.

(56) References Cited

U.S. PATENT DOCUMENTS

| | | | |
|---|---|---|---|
| 6,651,096 | B1 | 11/2003 | Gai et al. |
| 6,970,462 | B1 | 11/2005 | McRae |
| 7,181,567 | B2 | 2/2007 | Krishnan |
| 7,720,948 | B2 | 5/2010 | Hariharan et al. |
| 8,090,901 | B2 | 1/2012 | Lin et al. |
| 8,448,162 | B2 | 5/2013 | Ramanathan et al. |
| 8,750,144 | B1 | 6/2014 | Zhou et al. |
| 10,129,088 | B2 | 11/2018 | Sharma et al. |
| 2004/0170171 | A1 | 9/2004 | Kanekar et al. |
| 2006/0294297 | A1 | 12/2006 | Gupta |
| 2010/0080223 | A1 | 4/2010 | Wong et al. |
| 2013/0218853 | A1 | 8/2013 | Bullis et al. |

(Continued)

FOREIGN PATENT DOCUMENTS

WO      WO2017219842 A1      12/2017

OTHER PUBLICATIONS

Chang et al., TCAM-Based Multi-Match Packet Classification Using Multidimensional Rule Layering, IEEE Apr. 1, 2016, All pages.

(Continued)

*Primary Examiner* — Joseph R Maniwang
(74) *Attorney, Agent, or Firm* — Fountainhead Law Group, PC

(57) ABSTRACT

Techniques for implementing hitless network traffic policy upgrades are provided. In one set of embodiments, these techniques allow a hitless upgrade of a network traffic policy to be performed in a manner that guarantees all network packets subject to the policy are evaluated against either the old policy version or the new policy version. Accordingly, these techniques avoid scenarios where some network packets fail to be evaluated against the traffic policy at all during the hitless upgrade process (which can result in incorrect forwarding behavior).

18 Claims, 6 Drawing Sheets

(56) References Cited

U.S. PATENT DOCUMENTS

| | | | |
|---|---|---|---|
| 2013/0232104 A1 | | 9/2013 | Goyal et al. |
| 2013/0304917 A1 | | 11/2013 | Mittal et al. |
| 2019/0372895 A1 | * | 12/2019 | Parthasarathy ....... H04L 63/101 |
| 2020/0412615 A1 | | 12/2020 | Baskaran et al. |
| 2023/0308447 A1 | | 9/2023 | Ramakrishna |

OTHER PUBLICATIONS

Eugene W. Myers, "An O(ND) Difference Algortihm and Its Variations", Department of Computer Science, University of Arizona, vol. 1, Issue 1-4, Tucson, AZ, Nov. 1986, 15 pages.
Norige et al., A Ternary Unification Framework for Optimizing TCAM-Based Packet Classification Systems, Apr. 2018, IEEE, All Pages.
Shah et al., Fast updating algorithms for TCM, IEEE Micro (vol. 21, Issue 1, pp. 36-47, 2001.

* cited by examiner

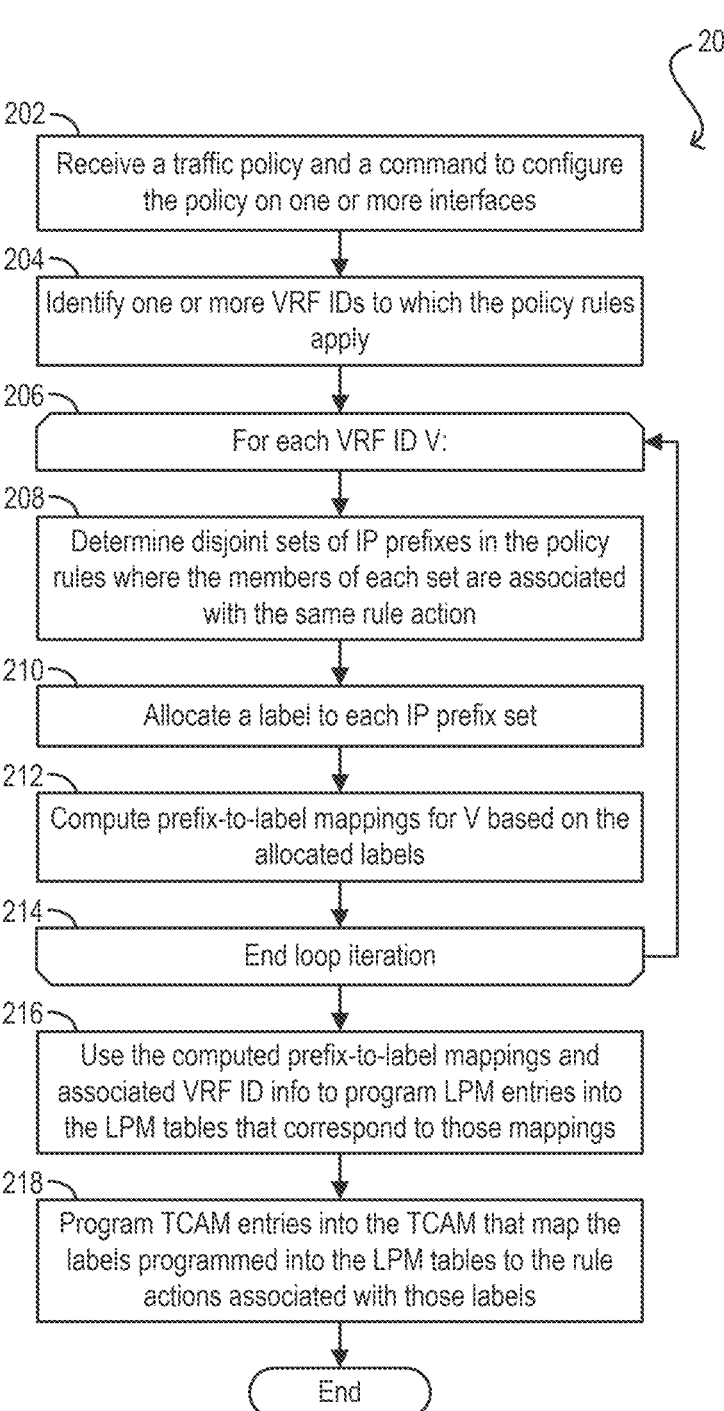

200

202 — Receive a traffic policy and a command to configure the policy on one or more interfaces 204 — Identify one or more VRF IDs to which the policy rules apply 206 — For each VRF ID V:

208 — Determine disjoint sets of IP prefixes in the policy rules where the members of each set are associated with the same rule action 210 — Allocate a label to each IP prefix set 212 — Compute prefix-to-label mappings for V based on the allocated labels 214 — End loop iteration 216 — Use the computed prefix-to-label mappings and associated VRF ID info to program LPM entries into the LPM tables that correspond to those mappings 218 — Program TCAM entries into the TCAM that map the labels programmed into the LPM tables to the rule actions associated with those labels End

*FIG. 2*

HITLESS NETWORK TRAFFIC POLICY UPGRADES

BACKGROUND

A network traffic policy (hereinafter simply "traffic policy") is a set of rules that governs how network packets are handled by a network device such as a switch or router. Each rule in a traffic policy includes one or more match criteria that are based on packet fields (e.g., source Internet Protocol (IP) address, destination IP address, etc.) and an action (e.g., permit, deny, redirect, etc.). When a network packet is received at a network device interface that is configured with a traffic policy, the packet is evaluated against the match criteria of the policy's rules to identify a rule that matches the packet. The action of the matched rule is then executed on the network packet.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2 depicts a workflow for programming longest prefix match (LPM) and ternary content-addressable memory (TCAM) entries for a traffic policy in accordance with certain embodiments of the present disclosure.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

The present disclosure describes techniques for implementing hitless upgrades of traffic policies in a network device. A "hitless" upgrade of a traffic policy involves updating the policy from an old version to a new version without incurring any service disruption or traffic loss.

In one set of embodiments, the techniques of the present disclosure allow a hitless upgrade of a traffic policy to be performed in a manner that guarantees all network packets subject to the policy are evaluated against either the old policy version or the new policy version. Accordingly, these techniques avoid scenarios where some network packets fail to be evaluated against the traffic policy at all during the hitless upgrade process (which can result in incorrect forwarding behavior).

1. Example Network Device

Figure 1:
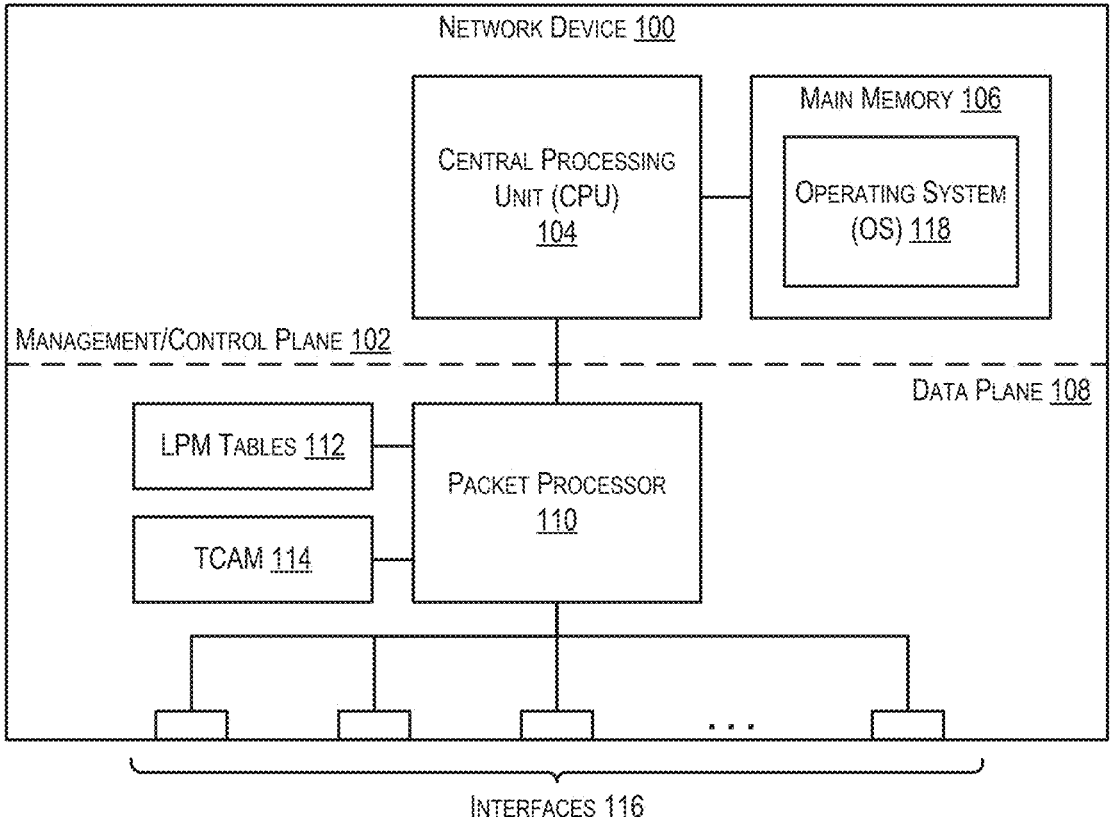
FIG. 1 depicts an example network device in accordance with certain embodiments of the present disclosure.

FIG. 1 is a simplified block diagram of a network device 100 (e.g., switch, router, etc.) in which the techniques of the present disclosure may be implemented. As shown, network device 100 includes a management/control plane 102 comprising a central processing unit (CPU) 104 and a main memory 106, as well as a data plane 108 comprising a packet processor 110, a set of longest prefix match (LPM) tables 112, a ternary content-addressable memory (TCAM) 114, and a plurality of interfaces (ports) 116.

CPU 104 is generally responsible for managing the configuration/operation of network device 100 and controlling the device's understanding of the network in which it resides. CPU 104 carries out these functions under the direction of an operating system (OS) 118 that runs on CPU 104 from main memory 106.

Packet processor 110 is generally responsible for handling the processing and physical movement of network packets through network device 100 at line speed (i.e., the data throughput speed supported by the device), often based on determinations made by CPU 104. In modern network devices, packet processor 110 is typically an application-specific integrated circuit (ASIC) or field-programmable gate array (FPGA) with multiple processing cores, where each processing core handles the network traffic for a particular subset of interfaces 116. For example, if packet processor 110 has two processing cores C1 and C2 and network device 100 includes a total of sixteen interfaces 116(1)-(16), processing core C1 may be designated to handle all network traffic passing through interfaces 116(1)-(8) and processing core C2 may be designated to handle all network traffic passing through interfaces 116(9)-(16).

For the purposes of this disclosure, it is assumed that network device 100 enables users to define and configure traffic policies on the interfaces of the device. For example, the users may configure traffic policies globally on all of the device's interfaces, or solely on the physical (front panel) or logical (e.g., port channel/LAG or SVI (VLAN)) interfaces of the device. As mentioned previously, a traffic policy is a set of rules that govern the handling of network traffic, where each rule includes one or more match criteria and an action. The match criteria specify packet fields (e.g., source IP address, destination IP address, source port, destination port, protocol, etc.) and corresponding values that indicate which network packets match the rule. For instance, a match criterion that pertains to the source IP address field or destination IP address field will typically specify an IP prefix indicating the range of IP addresses for the field that results in a match. The action indicates how packet processor 110 should handle network packets that match the rule. Common traffic policy actions include "permit" (which means that a matched packet will be allowed to be forwarded to its destination), "deny" (which means that a matched packet will be dropped/blocked), and "redirect" (which means that a matched packet will be redirected to an alternative destination). Other types of actions are also possible depending on the nature of the traffic policy and the design of packet processor 110.

By way of example, the following table presents the contents of a sample traffic policy T comprising three rules R1, R2, and R3:

TABLE 1

| (Traffic policy T) | | |
|---|---|---|
| Rule ID | Match Criteria | Action |
| R1 | Source IP prefix: 10.1.0.0/16 | Permit |
| R2 | Source IP prefix: 11.1.0.0/16 | Permit |
| R3 | Source IP prefix: 12.1.0.0/24 | Deny |

Rules R1 and R2 in this traffic policy indicate that network packets with a source IP address falling within the range 10.1.0.0 to 10.1.255.255 (as represented by IP prefix 10.1.0.0/16) or the range 11.1.0.0. to 11.1.255.255 (as represented by IP prefix 11.1.0.0/16) will be permitted. Rule R3 indicates that network packets with a source IP address falling within the range 12.1.0.0 to 12.1.0.255 (as represented by IP prefix 12.1.0.0/24) will be denied.

Traditionally, the traffic policies that are configured on a network device are programmed into a TCAM residing in the device's data plane. A TCAM is a type of high-speed memory that enables fast, parallel searching of its contents. For example, according to this traditional approach, the traffic policies configured on network device 100 may be programmed into TCAM 114 of the device's data plane 108.

This programming results in the creation of TCAM entries in the TCAM that correspond to the traffic policy rules. For instance, programming rule R1 of traffic policy T above into TCAM 114 of network device 100 would result in a TCAM entry with a key field specifying (among other things) the source IP prefix 10.1.0.0/16 and a result field specifying the "permit" action. With these TCAM entries in place, upon receiving a network packet that is subject to the configured traffic policies, packet processor 110 can perform a lookup into TCAM 114 in order to determine whether the network packet matches the key field of any of the TCAM entries. If a match is found, packet processor 110 can retrieve the action specified in the result field of the matched TCAM entry and execute the action on the packet.

One problem with the foregoing traditional approach is that network device TCAMs are often small in size due to their high cost. For example, even in high-end switches and routers that are intended for use in large-scale deployments, TCAM size is limited to a few hundred megabytes (MB) at most. This means that, in many cases, the TCAM of a network device will be too small to accommodate all of the traffic policy rules configured on the device.

To mitigate this problem, network device 100 of FIG. 1 employs a prefix summarization feature that leverages the device's LPM tables 112 for implementing traffic policies. LPM tables 112 are a set of hierarchical memory tables that are less expensive (and thus larger in capacity) than TCAM 114 and are designed to (1) store mappings between IP prefixes and target values, referred to as LPM entries, and (2) enable LPM searching on those prefixes. For instance, upon receiving an input IP address, LPM tables 112 will find the longest matching IP prefix stored in the tables and return its corresponding target value.

At a high level, prefix summarization enables network device 100 to map, via LPM tables 112, various disjoint sets of IP prefixes defined in the device's traffic policy rules to common labels. This in turn reduces the number of TCAM entries needed in TCAM 114 to implement those rules. As a simple example, assume a user configures a traffic policy comprising one thousand rules on a particular interface of network device 100, where each rule specifies a source IP address match criterion with a different IP prefix and an associated action of "permit." In this scenario, network device 100 can program LPM entries into LPM tables 112 that map the IP prefixes of those one thousand rules to a common label L, and program a single TCAM entry in TCAM 114 that identifies source label L in the key field and the action "permit" in the action field. Packet processor 110 can then perform a two-stage lookup on incoming network traffic to apply the traffic policy, where the first stage involves performing a first lookup into LPM tables 112 to retrieve label L for a matched packet and the second stage involves performing a second lookup into TCAM 114 to retrieve the "permit" action for label L. This approach is significantly more efficient in terms of TCAM usage than the traditional approach above, which would require the programming of one thousand separate TCAM entries in TCAM 114 (i.e., one TCAM entry for each rule in the traffic policy).

Figure 3:
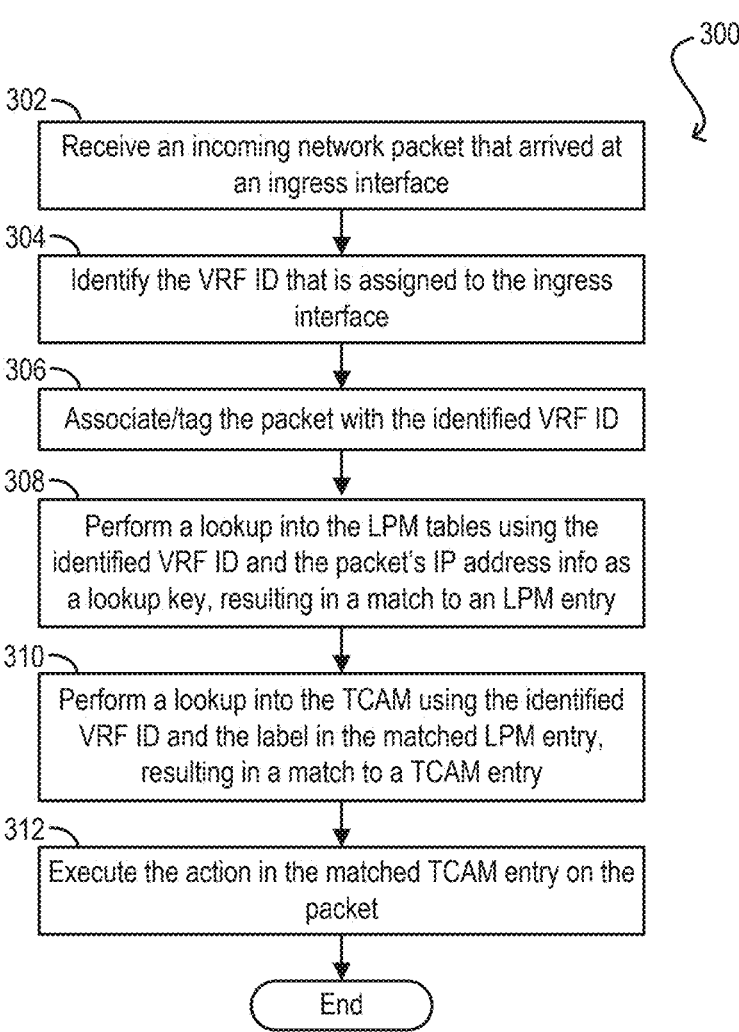
FIG. 3 depicts a workflow for enforcing a traffic policy in accordance with certain embodiments of the present disclosure.

To provide additional clarity regarding how network device 100 uses prefix summarization to implement traffic policies, FIG. 2 depicts a workflow 200 performed by CPU 104 via OS 118 for programming appropriate entries for a given traffic policy into LPM tables 112 and TCAM 114 respectively, and FIG. 3 depicts a workflow 300 performed by packet processor 110 for enforcing the traffic policy on incoming network traffic.

Starting with step 202 of workflow 200, CPU 104 receives a traffic policy and a command to configure the policy on one or more interfaces of network device 100. This traffic policy may be created by a human user/administrator of the device or by an automated agent.

At step 204, CPU 104 identifies one or more virtual routing and forwarding instances (VRFs) of network device 100 to which the traffic policy rules apply. A VRF is a logical routing/forwarding domain that allows multiple routing/forwarding pipelines to coexist within a network device. Each interface of network device 100 is assigned a VRF identifier (ID) (typically based on the processing core of packet processor 110 that is designated for handling the interface) and step 204 generally involves identifying the VRF IDs of the interfaces on which the traffic policy will be configured. For example, if the command received at step 202 indicates that the traffic policy rules should be configured on interfaces 1, 2, and 3 which are assigned VRF IDs 1000, 2000, and 3000 respectively, CPU 104 will identify these VRF IDs as part of step 204.

At steps 206 and 208, CPU 104 enters a loop for each identified VRF ID V and, within this loop, identifies non-overlapping (i.e., disjoint) sets of IP prefixes defined in the match criteria of the traffic policy rules, where the members of each IP prefix set are associated with the same action. CPU 104 then allocates a label to each IP prefix set (step 210) and computes prefix-to-label mappings for VRF ID V based on the allocated labels (step 212). For example, assume CPU 104 identifies two disjoint sets of IP prefixes S1 and S2 for VRF ID V where set S1 includes prefixes P1, P2, and P3 and set S2 includes prefixes P4 and P5. Further assume that CPU 104 allocates label L1 to set S1 and label L2 to set S2. In this scenario, the CPU will compute the following prefix-to-label mappings for VRF ID V at step 212: P1→L1, P2→L1, P3→L1, P4→L2, and P5→L2.

At step 214, CPU 104 reaches the end of the current loop iteration and returns to step 206 in order to process the next VRF ID. Once all VRF IDs have been processed, CPU 104 uses the computed prefix-to-label mappings and associated VRF ID information to program LPM entries into LPM tables 112 that correspond to those mappings (step 216). For example, the following table presents LPM entries that may be programmed into LPM tables 112 for traffic policy T noted above. In this example, traffic policy T applies to a single VRF identified by VRF ID 1000. As shown, each LPM entry is keyed by VRF ID and IP prefix and includes a label that is mapped to the VRF ID+IP prefix key.

TABLE 2

(LPM Entries for Traffic Policy T)

| Key | Target |
|-----|--------|
| VRF ID: 1000; IP Prefix: 10.1.0.0/16 | Label: 1011 |
| VRF ID: 1000; IP Prefix: 11.1.0.0/16 | Label: 1011 |
| VRF ID: 1000; IP Prefix: 12.1.0.0/24 | Label: 12 |

Further, at step 218, CPU 104 populates TCAM 114 with TCAM entries that map the labels programmed into LPM tables 112 to the traffic policy rule actions associated with those labels. For example, the following table presents TCAM entries that may be programmed into TCAM 114 for traffic policy T, given the labels presented in Table 2. As shown, each TCAM entry is keyed by VRF ID and label and includes an action that is mapped to the VRFID+label key.

TABLE 3

(TCAM Entries for Traffic Policy T)

| Key | Result |
|-----|--------|
| VRF ID: 1000; Source label: 1011 | Action: Permit |
| VRF ID: 1000; Source label: 12 | Action: Deny |

Turning now to FIG. 3, packet processor 110 receives an incoming network packet that arrived at network device 100 at an ingress interface (step 302), identifies the VRF ID that is assigned to the ingress interface (step 304), and associates/tags the packet with the identified VRF ID (step 306).

At step 308, packet processor 110 performs a lookup into LPM tables 112 using the identified VRF ID and the IP address information included in the packet header as a lookup key, potentially resulting in a match to an LPM entry.

Assuming a match is found at step 308, packet processor 100 performs a lookup into TCAM 114 using the identified VRF ID and the label included in the matched LPM entry as a lookup key, potentially resulting in a match to a TCAM entry (step 310).

Finally, assuming a match is found at step 310, packet processor 110 executes the action included in the matched TCAM entry on the network packet (step 312).

2. Solution Overview

When a traffic policy that is configured on network device 100 is updated in some manner (e.g., one or more rules are modified, added, or deleted), a traffic policy upgrade should be carried out that involves removing the existing LPM/TCAM entries for the prior (i.e., old) version of the policy and programming new LPM/TCAM entries which reflect the changes in the updated (i.e., new) version of the policy. Ideally, this upgrade is performed in a hitless fashion, such that network device 100 remains online and continues to process network traffic during the upgrade process.

One approach for implementing a traffic policy upgrade is to simply perform the removal of the existing LPM/TCAM entries and the programming of the new LPM/TCAM entries sequentially, such that all existing entries are removed before any new entries are programmed. However, this sequential approach can cause some network packets to fail to match both the old policy version and the new policy version, because there will be a short time window during which there will be no LPM/TCAM entries in place to handle incoming traffic. This can result in incorrect forwarding behavior, or a scenario in which some of the packets are copied to CPU 104 and forwarded in software (which is undesirable).

Figure 4:
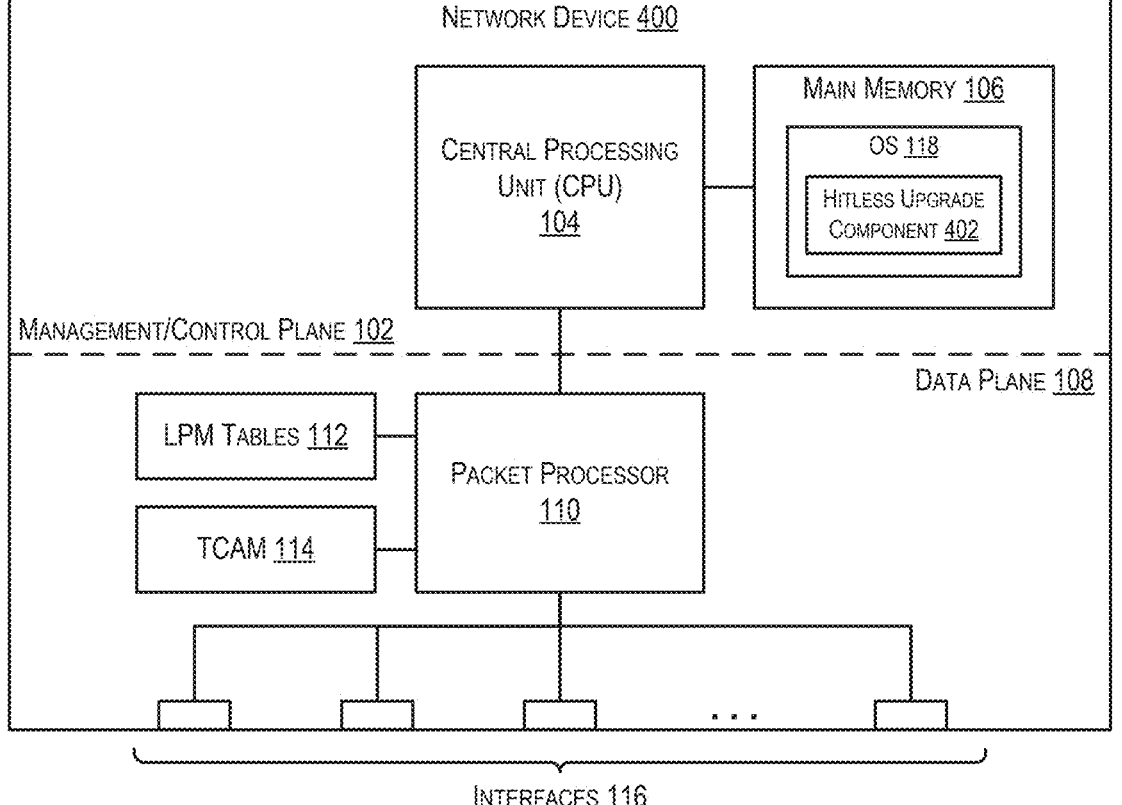
FIG. 4 depicts another example network device in accordance with certain embodiments of the present disclosure.

To address the foregoing and other related problems, FIG. 4 depicts an enhanced version 400 of network device 100 that includes a novel hitless traffic policy upgrade component (hereinafter simply "hitless upgrade component") 402 in the device's OS 118 according to certain embodiments. As explained in further detail in the next section, component 402 can enable CPU 104 of network device 400 to carry out a hitless upgrade of a traffic policy by (1) programming, for each VRF ID V configured on the device, new LPM and TCAM entries for the new policy version while the existing (old) LPM and TCAM entries for the old policy version remain in place (i.e., are still maintained in LPM tables 112 and TCAM 114), where the new LPM/TCAM entries are keyed by a new VRF ID V' corresponding to the new policy version; and (2) once all of the new LPM/TCAM entries have been programmed, executing a VRF ID switchover process that causes, for each VRF ID V, all interfaces of the device assigned to V to instead be assigned to new VRF ID V'.

Upon completing the VRF ID switchover, all incoming network traffic that previously would have been associated/tagged with old VRF ID V will instead be associated/tagged with new VRF ID V'. This will cause the traffic to be evaluated against the new entries in LPM tables 112 and TCAM 114 that correspond to the new policy version, thereby effectuating the traffic policy upgrade. The old LPM/TCAM entries can be deleted at that point. Significantly, because this approach does not remove the old LPM/TCAM entries before the new entries are programmed, this approach advantageously ensures that all incoming network traffic subject to the traffic policy will be evaluated against either the old or new policy version, thereby avoiding incorrect forwarding behavior.

Figure 5:
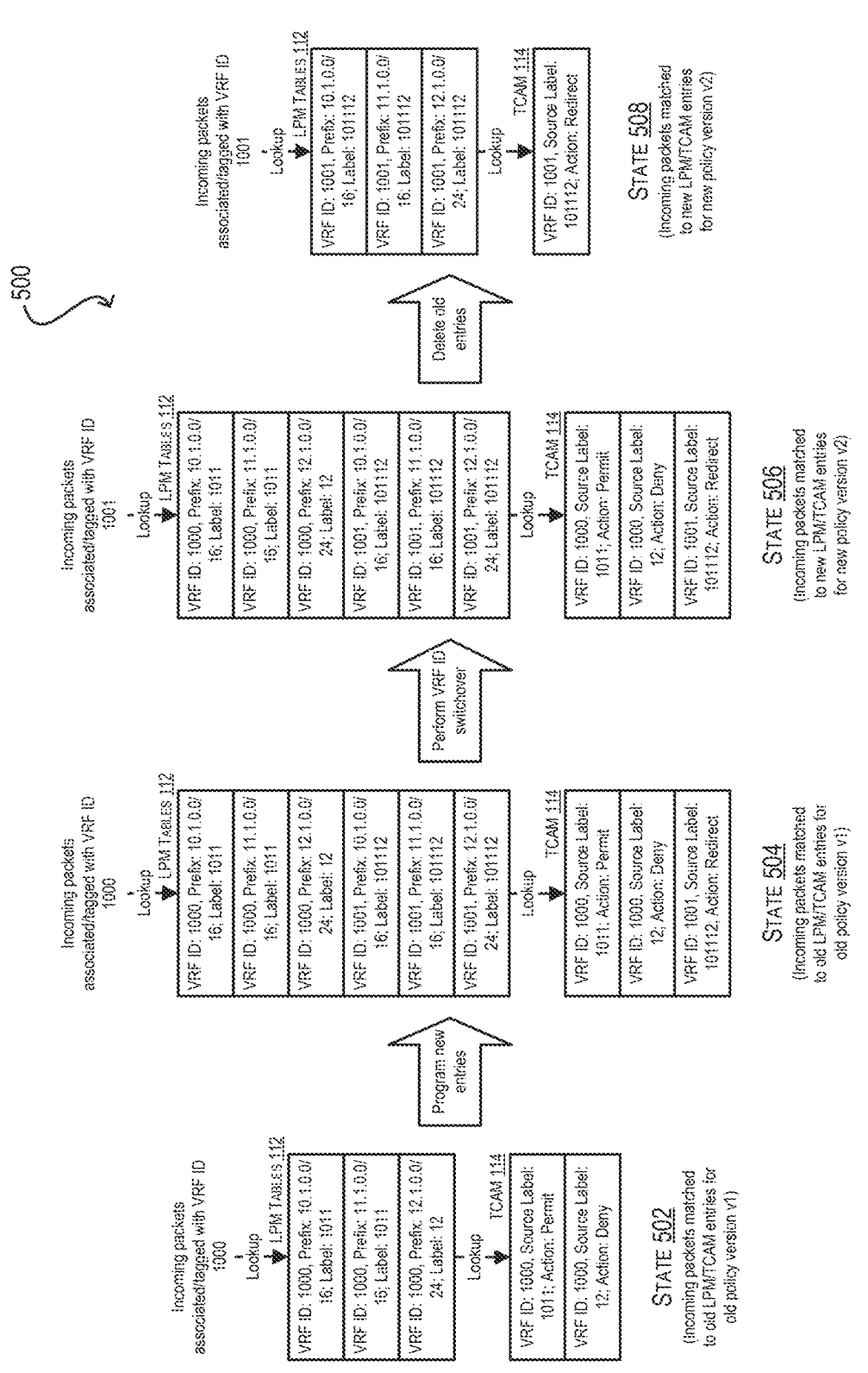
FIG. 5 depicts a hitless upgrade of a traffic policy in accordance with certain embodiments of the present disclosure.

By way of example, FIG. 5 is a diagram 500 illustrating a hitless upgrade of traffic policy T on network device 100 from an old version v1 (which is the version presented in Table 1 above) to a new version v2 presented in Table 4 below, in accordance with the techniques of the present disclosure. In this example, policy version v1 applies to a single VRF ID 1000 and the new VRF ID corresponding to old VRF ID 1000 (for policy version v2) is 1001.

TABLE 4

(New Version v2 of Traffic policy T)

| Rule ID | Match Criteria | Action |
|---------|----------------|--------|
| R1 | Source IP prefix: 10.1.0.0/16 | Redirect |
| R2 | Source IP prefix: 11.1.0.0/16 | Redirect |
| R3 | Source IP prefix: 12.1.0.0/24 | Redirect |

As shown in FIG. 5, at state 502 (which is prior to the initiation of the hitless upgrade), incoming network packets are received at one or more interfaces that are assigned VRD ID 1000 (such that the packets are associated/tagged with VRF ID 1000), which means that the packets will be matched to the (old) LPM/TCAM entries for policy version v1. At state 504, new entries are programmed into LPM tables 112 and TCAM 114 for policy version v2 (which are keyed by new VRF ID 1001), resulting in the co-existence of the old and new LPM/TCAM entries on a temporary basis.

At state 506, a VRF ID switchover is executed that causes all interfaces of network device 100 that are assigned old VRF ID 1000 to instead be assigned new VRF ID 1001. This in turn causes incoming network packets that were previously associated/tagged with VRF ID 1000 to be associated/tagged with VRF ID 1001, which means that the packets will now be matched to the new LPM/TCAM entries for new version v2.

Finally, at state 508, the old entries are removed from LPM tables 112 and TCAM 114, thereby completing the upgrade process.

It should be appreciated that FIGS. 1-5 and the foregoing high-level solution description are illustrative and not intended to limit embodiments of the present disclosure. For example, although FIGS. 1 and 4 depict a particular arrangement of components in network device 100/400, other arrangements are possible (e.g., the functionality attributed to a particular component may be split into multiple components, components may be combined, etc.). Further, although the foregoing description assumes that network device 100 programs prefix-to-label mappings in LPM tables 112 and label-to-action mappings in TCAM 114 (to optimize TCAM usage), the hitless upgrade techniques of the present disclosure may also be applied to network devices that do not implement this optimization (or in other words, network devices that only maintain match criteria-to-action mappings in the TCAM). In these cases, hitless upgrade component 402 will program new entries for the new policy version in the TCAM alone.

3. Hitless Upgrade Workflow

Figure 6:
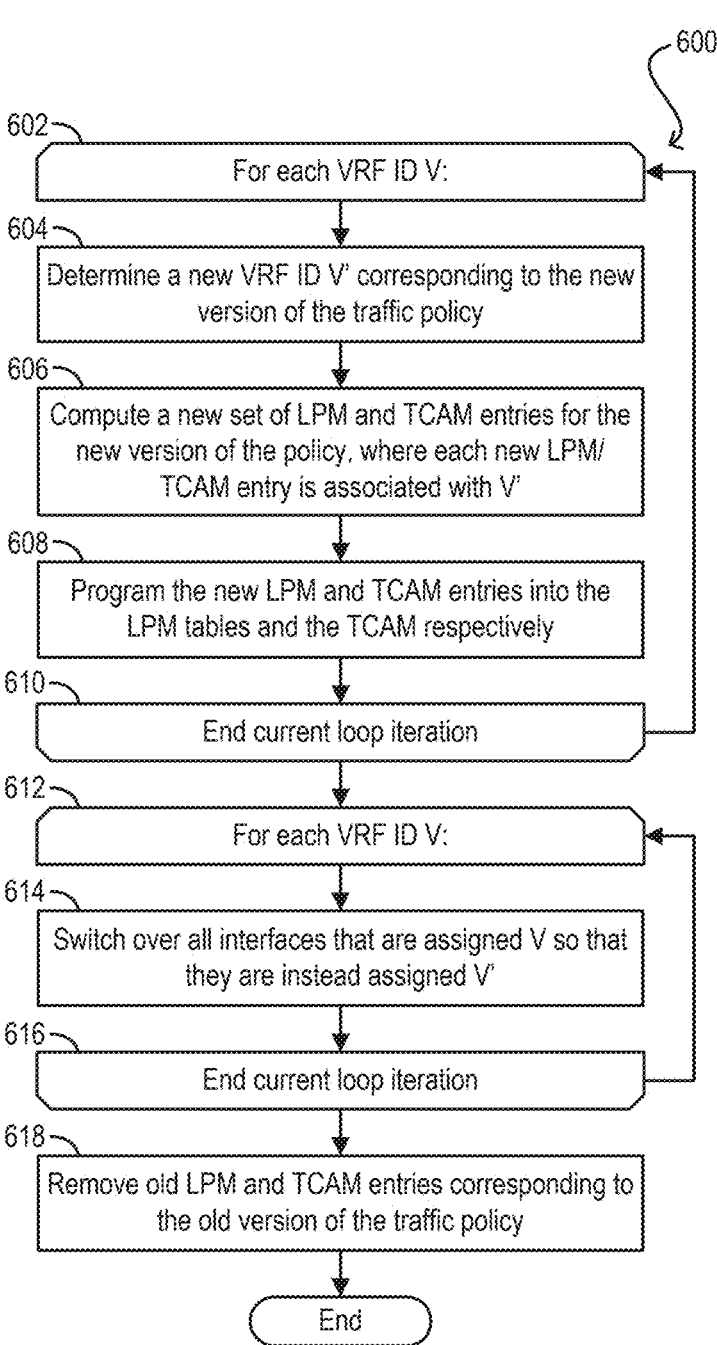
FIG. 6 depicts a workflow for implementing a hitless upgrade of a traffic policy in accordance with certain embodiments.

FIG. 6 depicts a workflow 600 that provides additional details regarding the processing that may be performed by CPU 104 of network device 100 (via hitless upgrade component 402) for carrying out a hitless upgrade of a traffic policy according to certain embodiments.

Starting with step 602, CPU 104 can enter a loop for each VRF ID V configured on network device 400. Within this loop, CPU 104 can determine a new VRF ID V' corresponding to the new version of the traffic policy (step 604). In various embodiments new VRF ID V' can be chosen arbitrarily or according to a predetermined rule, such as flipping the most significant bit of VRF ID V.

At step 606, CPU 104 can compute a set of new LPM and TCAM entries for the new policy version, where each new LPM/TCAM entry is associated with (or more precisely, keyed by) new VRF ID V'. CPU 104 can further program the new entries into LPM tables 112 and TCAM 114 respectively (step 608). As mentioned previously, CPU 104 can perform the programming of the new entries while the existing (old) LPM/TCAM entries for the old policy version are still held in LPM tables 112 and TCAM 114. CPU 104 can then reach the end of the current loop iteration (step 610) and return to the top of the loop to process the next VRF ID.

Once all VRF IDs have been processed, CPU 104 can enter a second loop for each VRF ID V (step 612). Within this second loop, CPU 104 can switch over all interfaces of network device 400 that are assigned VRF ID V so that they are instead assigned the corresponding new VRF ID V' (step 614). This VRF ID switchover can be accomplished in various ways, such as by changing interface-to-VRF ID mappings maintained in an interface table of the network device. As mentioned previously, this will cause all future network traffic received on those interfaces to be evaluated against the new LPM and TCAM entries programmed at 608 for the new policy version, thereby effectuating the traffic policy upgrade.

Upon completing step 614, CPU 104 can reach the end of the current loop iteration (step 616) and return to the top of the second loop to process the next VRF ID. Finally, at step 618, CPU 104 can remove the old entries in LPM tables 112 and TCAM 114 corresponding to the old policy version and workflow 600 can end. Although not shown in the workflow, if a problem occurs during the programming of the new LPM or TCAM entries (e.g., due to lack of available space in LPM tables 112 or TCAM 114), in certain embodiments CPU 104 can fall back to a sequential upgrade process where the old LPM/TCAM entries are removed prior to programming the new ones.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network device for implementing a hitless upgrade of a network traffic policy from an old version to a new version, the network device comprising one or more interfaces that are assigned an existing virtual routing and forwarding (VRF) identifier (ID), the method comprising:

determining a new VRF ID corresponding to the new version of the network traffic policy;

computing a new set of longest prefix match (LPM) entries for the new version of the network traffic policy, each LPM entry in the new set of LPM entries being associated with the new VRF ID;

computing a new set of ternary content-addressable memory (TCAM) entries for the new version of the network traffic policy, each TCAM entry in the new set of TCAM entries being associated with the new VRF ID;

programming the new set of LPM entries into a set of LPM tables of the network device;

programming the new set of TCAM entries into a TCAM of the network device; and after completing the programming of the new set of LPM entries and the new set of TCAM entries, performing a VRF ID switchover with respect to the one or more interfaces, the VRF ID switchover causing each interface in the one or more interfaces to be assigned the new VRF ID rather than the existing VRF ID.

2. The method of claim 1 wherein the programming of the new set of LPM entries is performed while an existing set of LPM entries associated with the existing VRF ID is stored in the set of LPM tables.

3. The method of claim 1 wherein the programming of the new set of TCAM entries is performed while an existing set of TCAM entries associated with the existing VRF ID is stored in the TCAM.

4. The method of claim 1 wherein the existing VRF ID identifies a VRF to which the old version of the network traffic policy applies.

5. The method of claim 1 wherein each LPM entry in the new set of LPM entries includes the new VRF ID, an Internet Protocol (IP) prefix taken from a match criterion of a rule in the new version of the network traffic policy, and a label that is mapped to the IP prefix.

6. The method of claim 1 wherein each TCAM entry in the new set of TCAM entries includes the new VRF ID, a label, and an action taken from a rule in the new version of the network traffic policy that is mapped to the label.

7. The method of claim 1 wherein the new VRF ID is determined by modifying the existing VRF ID according to a predetermined rule.

8. The method of claim 1 wherein performing the VRF ID switchover comprises:

modifying interface-to-VRF ID mappings maintained in an interface table of the network device.

9. The method of claim 1 further comprising, after performing the VRF ID switchover:

deleting the existing set of LPM entries from the set of LPM tables; and deleting the existing set of TCAM entries from the TCAM.

10. A network device comprising:

a central processing unit (CPU);

a packet processor;

one or more interfaces that are assigned an existing virtual routing and forwarding (VRF) identifier (ID);

a set of longest prefix match (LPM) tables;

a ternary content-addressable memory (TCAM); and a main memory having stored thereon program code that, when executed by the CPU, causes the CPU to execute a hitless upgrade of a network traffic policy from an old version to a new version by:

determining a new VRF ID corresponding to the new version of the network traffic policy;

computing a new set of LPM entries for the new version of the network traffic policy, each LPM entry in the new set of LPM entries being associated with the new VRF ID;

computing a new set of TCAM entries for the new version of the network traffic policy, each TCAM entry in the new set of TCAM entries being associated with the new VRF ID;

programming the new set of LPM entries into the set of LPM tables;

programming the new set of TCAM entries into the TCAM; and after completing the programming of the new set of LPM entries and the new set of TCAM entries, performing a VRF ID switchover with respect to the one or more interfaces, the VRF ID switchover causing each interface in the one or more interfaces to be assigned the new VRF ID rather than the existing VRF ID.

11. The network device of claim 10 wherein the programming of the new set of LPM entries is performed while an existing set of LPM entries associated with the existing VRF ID is stored in the set of LPM tables, and wherein the programming of the new set of TCAM entries is performed while an existing set of TCAM entries associated with the existing VRF ID is stored in the TCAM.

12. The network device of claim 10 wherein the existing VRF ID identifies a VRF to which the old version of the network traffic policy applies.

13. The network device of claim 10 wherein each LPM entry in the new set of LPM entries includes the new VRF ID, an Internet Protocol (IP) prefix taken from a match criterion of a rule in the new version of the network traffic policy, and a first label that is mapped to the IP prefix, and wherein each TCAM entry in the new set of TCAM entries includes the new VRF ID, a second label that is included in at least one LPM entry, and an action taken from a rule in the new version of the network traffic policy that is mapped to the second label.

14. The network device of claim 10 wherein the new VRF ID is determined by modifying the existing VRF ID according to a predetermined rule.

15. The network device of claim 10 wherein performing the VRF ID switchover comprises:

modifying interface-to-VRF ID mappings maintained in an interface table of the network device.

16. The network device of claim 10 wherein the program code further causes the CPU to, after performing the VRF ID switchover:

delete the existing set of LPM entries from the set of LPM tables; and delete the existing set of TCAM entries from the TCAM.

17. A method performed by a network device for implementing a hitless upgrade of a network traffic policy from an old version to a new version, the network device comprising one or more interfaces that are assigned an existing virtual routing and forwarding (VRF) identifier (ID), the method comprising:

determining a new VRF ID corresponding to the new version of the network traffic policy;

computing a new set of ternary content-addressable memory (TCAM) entries for the new version of the network traffic policy, each TCAM entry in the new set of TCAM entries being associated with the new VRF ID;

programming the new set of TCAM entries into a TCAM of the network device; and after completing the programming of the new set of TCAM entries, performing a VRF ID switchover with respect to the one or more interfaces, the VRF ID switchover causing each interface in the one or more interfaces to be assigned the new VRF ID rather than the existing VRF ID.

18. The method of claim 17 further comprising:

computing a new set of longest prefix match (LPM) entries for the new version of the network traffic policy, each LPM entry in the new set of LPM entries being associated with the new VRF ID; and programming the new set of LPM entries into a set of LPM tables of the network device.

* * * * *